United States Patent [19]
Johnson

[11] 3,872,727
[45] Mar. 25, 1975

[54] DISPOSABLE ELECTRICAL THERMOMETER SYSTEM AND COMPONENTS

[76] Inventor: Gene A. Johnson, 907 Campus Ave., Santa Ana, Calif. 92373

[22] Filed: Aug. 10, 1972

[21] Appl. No.: 279,621

[52] U.S. Cl............................. 73/362 AR, 338/28
[51] Int. Cl. ............................................ G01k 7/20
[58] Field of Search............. 73/362 AR; 323/75 H; 338/28

[56] References Cited
UNITED STATES PATENTS

| | | | |
|---|---|---|---|
| 1,411,396 | 4/1922 | Wilson et al. | 73/362 AR X |
| 3,348,415 | 10/1967 | Ash | 73/362 AR |
| 3,413,853 | 12/1968 | Rowell | 73/362 AR |
| 3,688,581 | 9/1972 | Le Quernec | 73/362 AR |

Primary Examiner—Richard C. Queisser
Assistant Examiner—Frederick Shoon
Attorney, Agent, or Firm—William A. Kemmel, Jr.

[57] ABSTRACT

A disposable thermometer system including a resistance bridge circuit having a metal sensing wire with a small linear resistance change per unit temperature change, a stable fixed potential source, and a high gain stable differential amplifier to amplify the current flow in the sensing wire and an ammeter to indicate the temperature sense by indicating the magnitude of said current flow. Included in said disposable thermometer system is temperature probe having a metal sensing wire embedded in electrically insulating solid material in a metal cap. An elongated tube is joined to said cap with a pair of insulating lead wires connected to the sensing wire and extending out of the tube and a plug is mounted on the other end of the tube adapted to receive the lead wires and connect them to a socket.

2 Claims, 6 Drawing Figures

DISPOSABLE ELECTRICAL THERMOMETER SYSTEM AND COMPONENTS

BACKGROUND OF THE INVENTION

At present, when it is desired to take the temperature of a patient, it is customarily done by utilizing a mercury thermometer which is inserted into a body cavity for a substantial period of time to permit the mercury column to rise to indicate the corresponding body temperature. The disadvantages of such use of a mercury thermometer are well known to medical personnel. Such disadvantages include the fragile construction of the mercury thermometer so that careful handling is always required and there is a significant breakage problem with its attendent hazard of the dispersion of the mercury. Also, a substantial time period is required to permit the mercury thermometer to reach body temperature and to read the thermometer after such temperature is reached. Moreover, since the mercury thermometer is reused, after every use it is required to be sterilized which takes time and expense and contributes to its handling problem.

Because of the disadvantages of the mercury thermometer, it has been proposed that the temperature of patients be taken by electrical devices which have a resistance bridge circuit and a temperature probe with a temperature sensitive resistance element which is part of the bridge circuit so that the change in resistance of the resistance element caused by the temperature being measured is displayed on an ammeter which is marked to indicate the corresponding temperature. Such electrical devices have the advantages of being rugged and providing prompt temperature readings; however, such electrical devices in turn have suffered from substantial disadvantages which have prevented their general acceptance into hospitals and by the medial profession. Among such disadvantages, has been the fact that proposed temperature probes have always employed a resistance element having relatively high resistance change per unit temperature change e.g. hundreds of ohms in order to measure accurately the body temperatures which normally change over a relatively small range. Such high sensitivity resistance element such as thermisters are relatively expensive and have associated problems such as stability over a period of time and a substantially non-linear response to temperature change. Consequently, presently proposed temperature probes utilizing a resistance element have to be reused and their resistance change is normally measured with no amplification or relatively low amplification to minimize the non-linearity of their response. Examples of such electrical temperature measuring devices are described in U.S. Pat. No. 3,348,415, issued to T. C. Ash, Jr. on Oct. 24, 1967, entitled Temperature Measuring Device and U.S. Pat. No. 3,377,862, issued Apr. 16, 1968 to P. Gheorghiu entitled Electronic Clinical Thermometer. Some of such disadvantages, particularly the need to reuse such temperature probes with the consequential time and expense involved in sterilizing it, have been recognized by those skilled in the art. Consequently, disposable sheaths have been proposed for use in connection with such probes to overcome such problems. Such approach is illustrated by U.S. Pat. No. 3,349,896 issued Oct. 31, 1967 and U.S. Pat. No. 3,367,186 issued Feb. 6, 1968 to J. D. Emson, et al, entitled Disposable Sheath and Sheath Retainer for Temperature Sensing Probes and Resistance Thermometer, respectively. However, the use of a sheath not only increases the time required to take the temperature not only because of the time required to install and remove such sheath but also because such sheath increases the time required for the resistance element to respond to the body temperature. Also, in practice even with the use of sheaths there have been sterilization problems in connection with the use of probes.

Consequently, an object of the present invention is a temperature probe used in a disposable thermometer system which is inexpensive enough to permit its discard after a single use.

Another object of the present invention is a temperature probe which is both stable over a long period of time and which is highly accurate in giving a substantially linear resistance change per unit temperature change.

Still another object of the present invention is a stable accurate disposable thermometer system which is adapted to amplify small resistance changes with high gain and accuracy to permit accurate temperature determination over a small range.

The foregoing advantages of the present invention will be readily apparent from the following description and drawings which illustrate a preferred exemplary embodiment of the present invention.

SUMMARY OF INVENTION

In summary, the present invention involves a disposable thermometer system comprising a resistance bridge circuit having a metal sensing wire with a stable small linear resistance change per unit temperature change, i.e. less than 1% per degree centigrade, a stable fixed potential source connected to such bridge circuit, and a stable differential amplifier circuit connected to such bridge circuit adapted to amplify the current flow resulting from the resistance change in metal sensing wire caused by temperature change by a factor of least 300. Connected to the output of such amplifier circuit is an ammeter adapted to indicate the magnitude of such current flow, and thereby indicate the temperature sensed by the sensing wire. In addition, such sensing wire is incorporated in a temperature probe which has a metal cap filled with an electrically insulating solid material in which the sensing wire is embedded, an elongated tube joined to such cap and a pair of lead wires connected to the sensing wire and extending along the length and out of the other end of said tube. On the other end of said tube is a plug through which such lead wires extend which is adapted to facilitate the connection of such lead wires into the resistance bridge circuit.

In order to facilitate understanding of the present invention, reference will now be made to the appended drawings of the preferred specific embodiment of the present invention. Such drawings, like the preceding summary, should not be construed as limiting the invention which is properly set forth in the appended claims.

DESCRIPTION OF THE PREFERRED EMBODIMENT OF THE PRESENT INVENTION

Figure 1:
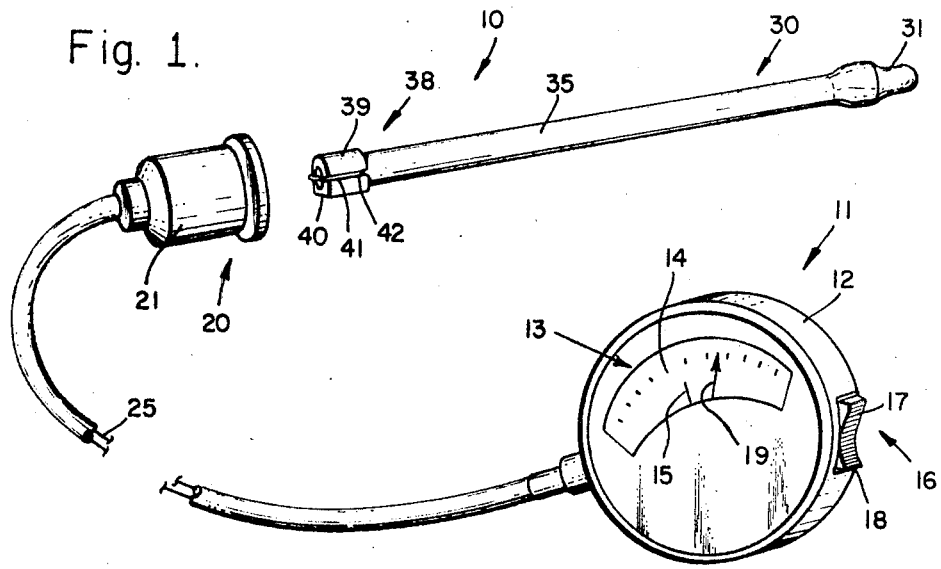
FIG. 1 is a perspective view of the disposable thermometer system of the present invention.

As illustrated in FIG. 1 – 5, the disposable thermometer system 10 comprises a meter 11 having a socket 20 electrically connected thereto by connecting wires 25 and a temperature probe 30 adapted to be inserted into the socket 20 to determine the temperature of a patient. The meter 11 includes a case 12 enclosing the electrical circuit 50 and having a window 13 through which is displayed the indicator needle 19 and a scale 14 whose units are marked to read temperature in degrees fahrenheit or centigrade or both in the range normally encountered in measuring temperatures of medical patients e.g. 94° to 106° F. Also displayed is an index mark 15 which indicates the lower limit of the usable voltage range of the batteries used to provide a potential source to the electrical circuit e.g. 9.8 volts for mercury cells. On one side of the case 12 is a dual switch 16 having lugs 17 and 18 whose functions are described below in connection with the description of the electrical circuit 50.

Connected through the case 12 of the meter 11 to the electrical circuit 50 by connecting wires 25 is a socket 20 having a cylindrical wall 21 forming a recess 22 having a substantially circular cross section except for one flat side wall 23 so that a plug being inserted therin can only be inserted in a single orientation. Extending along the opposite sides of the circular portion of the recess 22 are a pair of prongs 24 extending from the connecting wires 25 and adapted to contact the ends 42 of the lead wires 36 of the temperature probe 30 and to be received into the grooves 41 of the plug 38 on the temperature probe 30.

Figure 2:
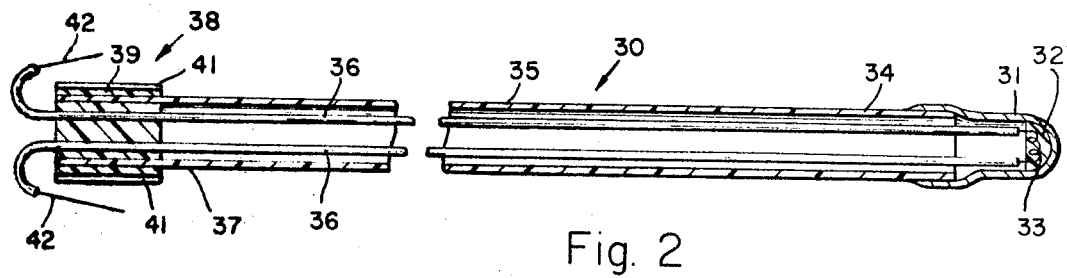
FIG. 2 is an axial cross-sectional view of the temperature probe portion of the disposal thermometer system of FIG. 1.
Figure 4:
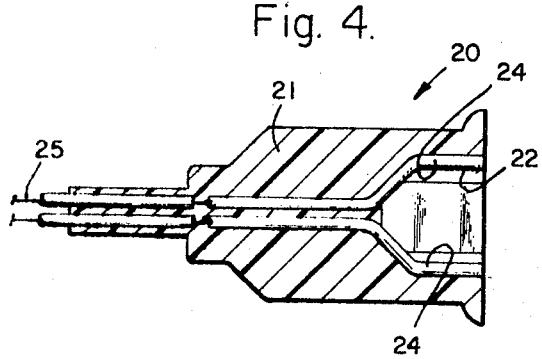
FIG. 4 is an axial cross-sectional view of the socket portion of the disposable thermometer system shown in FIG. 1.
Figure 5:
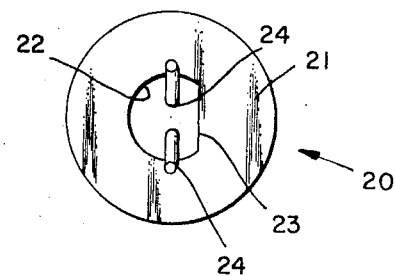
FIG. 5 is an end view of FIG. 4.
Figure 3:
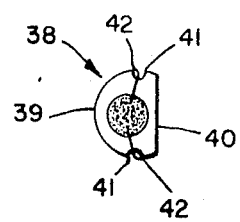
FIG. 3 is an end view of a temperature probe of FIG. 2.

The temperature probe 30 shown in FIGS. 1 – 3 includes a metal cap 31 with its end filled with an electrically insulating solid material 32 which is cured plastic adhesive having a metal powder distributed throughout it adapted to increase its heat conductivity while remaining electrically insulating. For example, the metal cap may be formed of aluminum, the cured plastic adhesive may be an epoxy resin having aluminum powder disbursed in it such as that sold by Conap Inc. Embedded in the solid material 32 is a metal sensing wire 33 which has the stable, linear, small resistance change per unit temperature change. For example, such metal sensing wire may consist of substantially pure nickel have the resistance change of 0.66% per degree centigrade in the selected temperature range. Joined at one end 34 to the cap 31 by the cured plastic adhesive 32 is an elongated tube 35. Connected to opposite ends of the metal sensing wire 33 is a pair of insulated lead wires 36 which extend along the length of the tube 35 and out its other end 37. Mounted on the other end 37 of the tube 35 is a cylindrical plug 38 having a major circular cross sectional portion 39 a minor flat portion 40 adapted to be received in the recess 22 of the socket 20. Extending along opposite sides of the wall of the plug 38 are a pair of grooves 41 which are adapted to receive the uninsulated end 42 of the lead wires 36 and to receive the prongs 24 of the connecting wires 25 and to maintain contact there between.

Within the meter 11 is an electrical circuit 50 which is adapted to convert the stable, small, linear resistance change per unit temperature change of the sensing wire 33 into a relatively much larger current change flowing through a microammeter 99 whose output is displayed on scale 14 of the meter 11. Electrical circuit 50 includes a resistance bridge circuit 51 having a first arm 52 comprising a metal sensing wire 33 having a stable, linear, small resistance change per unit temperature change. Sensing wire 33 has a selected total resistance at a predetermined temperature such as, for example, 50 ohms at 25° centigrade. The metal sensing wire 33 is connected to the remaining portions of the resistance bridge circuit 51 by lead wires 36 and connecting wires 25. Joined at one end 53 to one end 54 of the first arm 52 is a second arm 55 having a fixed selected resistance 56. Joined at one end 57 to the other end 58 to the first arm 52 is a third arm 59 having a fixed selected resistance element 60. Opposing the first arm 52 is a fourth arm 61 which is joined at one end 62 to the other end 63 of the second arm 55. Similarly, the other end 64 of the fourth arm 61 is joined to the other end 65 of the third arm 59. The fourth arm 61 includes a fixed selected resistance element 66 and a variable resistance 67 adapted to balance the bridge circuit 51 at the aforementioned predetermined temperature. Each of the selected fixed resistances 56, 60, and 66 and the variable resistance 67 are substantially stable with respect to temperature change.

Connected across the junction 68 between the first arm 52 and second arm 55 and the junction 69 between the third arm 59 and the fourth arm 61 is a stable fixed potential source 70. The potential source 70 includes a battery 71 such as a mercury cell which has a voltage output of approximately 9.8 volts with its positive pole connected to the junction 68 and at its negative pole through switch 16 to the potential stabilizing circuit 72 which includes the resistance 73, the Zener diode 74 and transistor 75. The output of the circuit 72 is connected to the junction 69 of the bridge circuit 51 as well as to lead VI of the differential amplifier 87. Connection through switch 16 to the potential stabilizing circuit 72 is made by depressing lug 17 which contacts arm 76 with contact 77 as well as arm 88 with contact 89.

Connected across the junction 78 between the first arm 52 and third arm 59 and the junction 79 between the second arm 55 and fourth arm 61 of the bridge circuit 51 is a differential amplifier circuit 80 adapted to amplify the current flow resulting from the resistance change in the metal sensing wire 33 in the first arm 52 caused by temperature change by a factor of at least 300. The differential amplifier circuit 80 includes a stable potential source 81 having a battery 82 such as a mercury cell connected at its negative pole to lead II of the differential amplifier 87 and at its positive pole through switch 16 to the stable voltage circuit 83 consisting of the resistance 84, the Zener diode 85 and the transistor 86 which supplies stable voltage to lead XIII of the differential amplifier 87. Connection through switch 16 is made by depressing lug 17 which contact arm 88 with contact 89. The leads III and IV of the differential amplifier 87 are connected to junctions 79 and 78 respectively of the bridge circuit 51. Connected across leads IX and X of the differential amplifier 87 is an RC circuit 90 consisting of a capacitor of 91 and a resistance 92. Similarly connected across the leads I and XI of the differential amplifier 87 is an RC circuit 93 consisting of a capacitor 94 and a resistance 95. Both RC circuits 90 and 93 are adapted to stabilize the performance of the differential amplifier 87 and prevent oscillation therein. Connected between the output lead XII and lead III of the differential amplier 87 is a feedback circuit 96 consisting of a resistance 97 adapted to determine the gain of the differential amplifier 87.

Connected in series to the output of the differential amplifier circuit 80 is a variable resistance 98 and an ammeter 99 which are then connected to the positive pole of the battery 71. The ammeter 99 is adapted to indicate the magnitude of the current flow in the first arm 52 after it is amplified by the differential amplifier circuit 80 and thereby indicating the temperature sensed by the metal sensing wire 33. The variable resistance 98 functions as a gain adjustment for the ammeter 99 during the calibration of the meter. In addition, when the lug 18 of the switch 16 is depressed so that arm 76 contacts contact 100 current flow directly from battery 71 through the resistance 101 and the ammeter 99, so that the second scale 15 of the meter 11 indicates the voltage output of the battery and thereby its condition.

Figure 6:
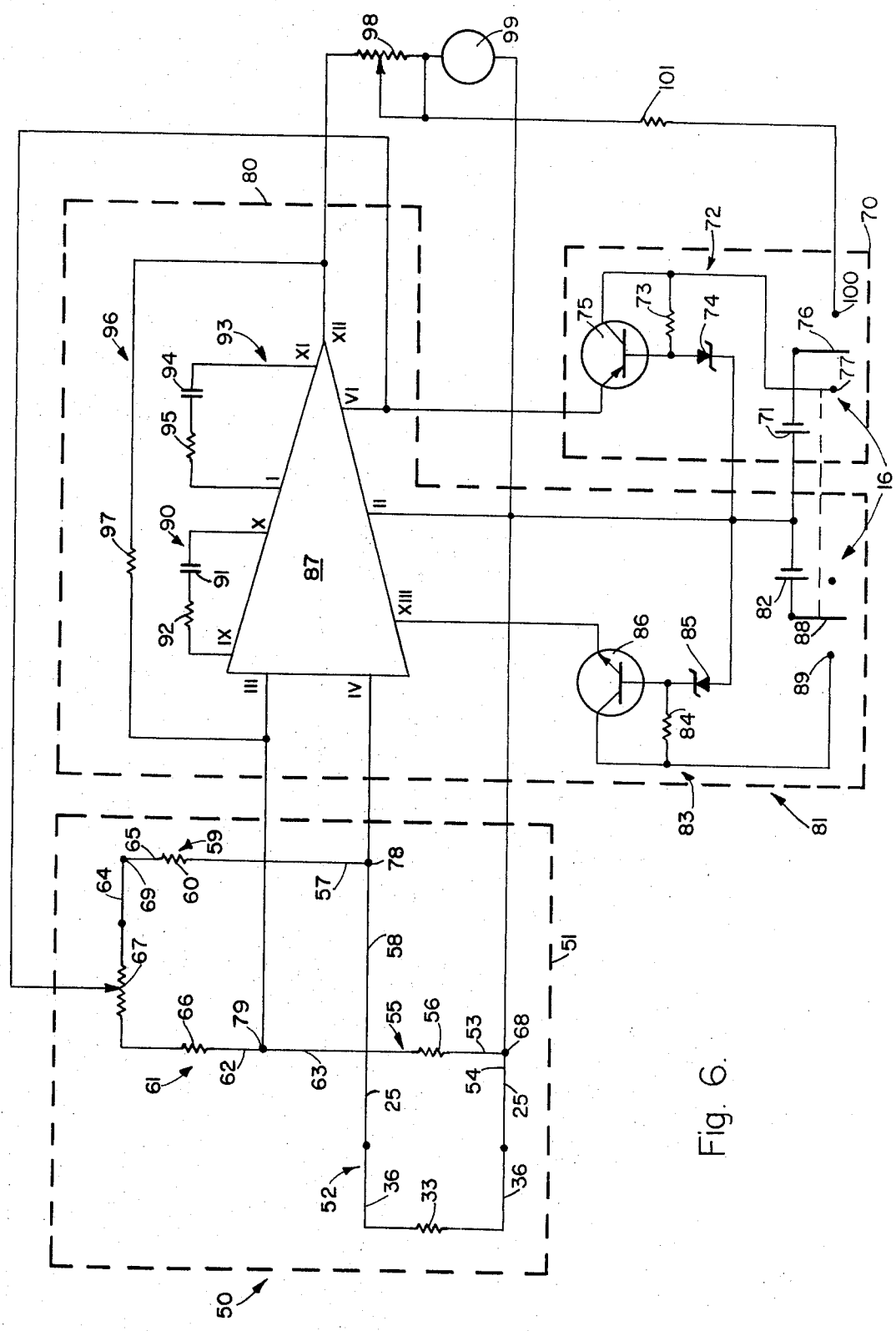
FIG. 6 is a schematic diagram of the electrical circuit portion of the disposal thermometer system of shown in FIG. 1.

A preferred specific circuit of the electrical circuit shown in FIG. 6 has the following specific elements and values:

| | |
|---|---|
| Battery 71 | 9.8 volts |
| Battery 82 | 9.8 volts |
| Zener diodes 74 and 85 | IN754A |
| Resistances 73 and 84 | 1,000 ohms |
| Transistor 75 | MPS3638 |
| Transistor 86 | 2N3707 |
| Resistance 56 | 50 ohms |
| Resistance 66 | 5,620 ohms |
| Resistance 67 | Maximum 2,000 ohms |
| Resistance 60 | 6,650 ohms |
| Differential amplifier 87 | CA3030 |
| Capacitors 91 and 94 | 120 pico farads |
| Resistances 92 and 95 | 360 ohms |
| Resistance 97 | 5,600 ohms |
| Resistance 98 | Maximum 2,000 ohms |
| Resistance 101 | 240,000 ohms |
| Microammeter 99 | 0-50 micro amps; 2,000 ohms; 90-110° F |

The operation of the disposable thermometer system 10 starts with initial factory calibration by inserting into the socket 20, in place of the temperature probe 30, a resistance plug (not shown) having a selected resistance embedded therein. Such selected resistance has a resistance equivalent to that of the temperature probe at a selected temperature, e.g. 100° F. On the scale 14 is a test line (not shown) corresponding to such selected temperature. Then lug 17 of switch 16 is depressed so that arms 76 and 88 contact contacts 77 and 89 respectively. If the needle 19 of the meter 11 registers other than on the test line, the variable resistance 67 is adjusted to bring the bridge circuit 50 into balance at such reference point. Similarly, if a temperature change of, for example 1° fahrenheit, results in a corresponding change on the scale 14 of more or less than one degree fahrenheit, the resistance 98 can be adjusted so that the change recorded on the scale 14 corresponds to the temperature change sensed by the metal sensing wire 33. After such calibration, (which preferably repeated at 6 month interval) the disposable thermometer system 10 is ready for use; however, the proper initial step is to depress lug 18 to check that the battery 71 is generating sufficient voltage to properly operate the electrical circuit 50 i.e. the needle 19 is above the index mark 15. After such battery check, the temperature of the patient can be checked simply by inserting the temperature probe 30 into the patient's mouth depressing the lug 17 of the switch 16 and promptly recording the temperature displayed on the scale 14.

It will be appreciated that many other specific embodiments of the present invention would be obvious to one skilled in the art in view of the disclosure of the present invention. For example, the metal sensing wire 33 may be made of other metals having substantially similar characteristics to nickel such as a nickel-iron alloy, for example, an alloy of 80% nickel and 20% iron. Likewise, the resistance 66 could be replaced by utilizing a portion of the variable resistance 67. In addition, the differential amplifier 87 could be replaced by a similar differential amplifier having comparable characteristics such as CA3015.

There are many features of the present invention which clearly show the significant advance which the present invention achieves over the prior art. Consequently, only a few of the more outstanding features will be pointed out to illustrate the unexpected and unusual results obtained by the present invention. One feature of the present invention is that the temperature probe by utilizing a simple metal sensing wire provides several substantial advantages. First, such sensing wire being quite inexpensive, permits the temperature probe to be in turn quite inexpensive and thus disposed after a single use. Second, utilizing a metal sensing wire substantially simplifies the manufacturing process and permits production of temperature probes having highly reproduceable characteristics so that the probes can be interchangeable used with the electrical circuit 50 and still obtain a high degree of accuracy in the measurement of temperature. Third, utilizing a metal sensing wire permits the accurate measurement of resistance since its resistance change per unit temperature change is small, linear and stable. Another feature of the present invention is that the cured plastic solid material in which the sensing wire is embedded is both electrically insulating and heat conducting so that although the temperature may be readily sensed by the sensing wire, it is electrically isolated from the patient and thus is quite safe in use. Still another feature of the present invention is that the combination of the metal sensing wire having a stable substantially linear resistance change per unit temperature change is combined with a differential amplifier having a stable high gain so that temperature can be measured accurately by utilizing a small resistance change.

It will be understood that the foregoing description and drawings are only illustrative of the present invention and it is not intended that the present invention be limited thereto. All substitutions, alterations, and modifications of the present invention which come within the scope of the following claims or to which the present invention is readily susceptible without departing from the spirit or scope of this disclosure are considered part of the present invention.

I claim:

1. In a thermometer system including a detachable temperature probe containing a temperature sensitive element, a resistance bridge circuit, a fixed potential source, an amplifier, and an ammeter, the improvement comprising:
   a. said temperature probe being inexpensive and disposable and including:
      i. an elongated tube;
      ii. a plug mounted on the first end of said tube and having a cross sectional shape adapted to limit its insertion into a socket to a single orientation and a pair of grooves along its length,
      iii. a metal cap mounted on the second end of said tube and being filled with an electrically insulating solid material comprising a cured adhesive material having metal powder distributed throughout it adapted to increase its heat conductivity while remaining electrically insulating,
      iv. a temperature sensitive element consisting of a short metal sensing wire having a selected total resistance at a predetermined temperature, a stable substantially linear, small resistance change per unit temperature change of less than 1% per degree centigrade, having a length which is less than the diameter of said tube and being embedded in said solid material in said cap, and
      v. a pair of insulated lead wires connected to the opposite ends of said sensing wire and extending through said elongated tube and said plug whose grooves are adapted to receive said lead wires;
   b. said resistance bridge circuit having a first arm comprising said sensing wire, a second and third arm each joined at one end by means of said plug to opposite ends of said first arm and a fourth arm opposing said first arm and joined at opposite ends to the other ends of the second and third arms, each of said second, third and fourth arms comprising a resistance element having a selected fixed resistance substantially stable with respect to temperature change and said fourth arm having a variable resistance adapted to balance said bridge at said predetermined temperature;
   c. said fixed potential source being connected across the junctions between said first and second arms and between said third and fourth arms;
   d. said amplifier being a differential amplifier circuit connected across the junctions between said first and third arms and between said second and fourth arms and being adapted to amplify the current flow resulting from the resistance change in said first arm caused by a temperature change by a factor of at least 300; and
   e. said ammeter being connected to the output of said amplifier circuit and adapted to indicate the magnitude of said current flow in said first arm and thereby indicate the temperature sensed by said sensing wire.

2. A disposable thermometer system as stated in claim 1 wherein said metal sensing wire consists of substantially pure nickel.

* * * * *